United States Patent
Min et al.

(10) Patent No.: US 10,007,641 B2
(45) Date of Patent: Jun. 26, 2018

(54) SYSTEM AND METHOD FOR MANAGING VEHICLE BY USING MOBILE TERMINAL

(71) Applicant: Samsung Electronics Co., Ltd, Gyeonggi-do (KR)

(72) Inventors: Hyun-Suk Min, Gyeonggi-do (KR); Dae-Yeon Jeong, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 13/707,344

(22) Filed: Dec. 6, 2012

(65) Prior Publication Data

US 2013/0144471 A1    Jun. 6, 2013

(30) Foreign Application Priority Data

Dec. 6, 2011 (KR) .......................... 10-2011-0129911

(51) Int. Cl.
*G06F 17/00* (2006.01)
*B60W 40/00* (2006.01)
*G07C 5/00* (2006.01)

(52) U.S. Cl.
CPC ............. *G06F 17/00* (2013.01); *B60W 40/00* (2013.01); *G07C 5/006* (2013.01); *G07C 5/008* (2013.01); *G07C 2205/02* (2013.01)

(58) Field of Classification Search
CPC ..... G06F 17/00; G07C 5/006; G07C 2205/02; G07C 5/008
USPC .......................................................... 701/36
See application file for complete search history.

(56) References Cited

U.S. PATENT DOCUMENTS

| 8,725,135 B2 | 5/2014 | Weyl et al. |
| 9,140,570 B1* | 9/2015 | Baird ................. G01C 21/3446 |
| 2005/0021227 A1* | 1/2005 | Matsumoto ........ G01C 21/3415 |
| | | 701/431 |
| 2005/0073388 A1* | 4/2005 | Lee et al. ....................... 340/5.1 |
| 2005/0273219 A1* | 12/2005 | Kitao ...................... B60R 25/00 |
| | | 701/2 |
| 2007/0287439 A1 | 12/2007 | Weyl et al. |
| 2008/0249874 A1 | 10/2008 | Seo |
| 2009/0248285 A1 | 10/2009 | Bauer |
| 2009/0265099 A1* | 10/2009 | Gottlieb ........................ 701/208 |

(Continued)

FOREIGN PATENT DOCUMENTS

| CN | 101080693 | 11/2007 |
| JP | 2005-221345 | 8/2005 |

(Continued)

OTHER PUBLICATIONS

International Search Report dated Mar. 21, 2013 in connection with International Patent Application No. PCT/KR2012/010401, 3 pages.

(Continued)

*Primary Examiner* — Genna M Mott (57) ABSTRACT

A system and method for managing a vehicle by using a mobile terminal. The mobile terminal includes: a vehicle verification unit that receives information for verifying a vehicle management terminal and verifies the vehicle management terminal based on the received information; and a terminal information collecting unit for collecting information regarding control of a vehicle.

20 Claims, 6 Drawing Sheets

(56) References Cited

U.S. PATENT DOCUMENTS

| | | | |
|---|---|---|---|
| 2010/0082230 A1* | 4/2010 | Hong .................... | G01C 21/362 |
| | | | 701/533 |
| 2010/0106345 A1 | 4/2010 | Hwang et al. | |
| 2010/0115505 A1 | 5/2010 | Touati et al. | |
| 2010/0125387 A1* | 5/2010 | Sehyun et al. .................. | 701/36 |
| 2011/0093137 A1 | 4/2011 | Moinzadeh et al. | |
| 2011/0160964 A1* | 6/2011 | Obradoyich .................... | 701/41 |

FOREIGN PATENT DOCUMENTS

| | | |
|---|---|---|
| JP | 2009506451 A | 2/2009 |
| JP | 2010-081419 | 4/2010 |
| KR | 20040050749 A | 6/2004 |
| KR | 10-2009-0066259 | 6/2009 |
| KR | 20100040554 A | 4/2010 |
| KR | 10-2011-0082881 | 7/2011 |
| WO | WO 2009/037713 A2 | 3/2009 |
| WO | 2011147893 A1 | 12/2011 |

OTHER PUBLICATIONS

Written Opinion of International Searching Authority dated Mar. 21, 2013 in connection with International Patent Application No. PCT/KR2012/010401, 5 pages.

Chinese Office Action and English translation issued for CN 201280060477.8 dated Dec. 3, 2015, 17 pgs.

European Examination Report dated Sep. 23, 2016 in connection with European Application No. 12855864.0, 11 pages.

European Patent Office, "Supplementary European Search Report," European Application No. EP12855864.0, Jul. 30, 2015, 9 pages.

\* cited by examiner

| WEATHER | MOISTURE PREVENTING APPARATUS | WIPER APPARATUS |
|---|---|---|
| SUNNY | OFF | OFF |
| CLOUDY | ON | OFF |
| RAINY | ON | ON |

SYSTEM AND METHOD FOR MANAGING VEHICLE BY USING MOBILE TERMINAL

CROSS-REFERENCE TO RELATED APPLICATION(S) AND CLAIM OF PRIORITY

The present application is related to and claims the benefit of Korean Patent Application No. 10-2011-0129911, filed on Dec. 6, 2011, in the Korean Intellectual Property Office, the disclosure of which is incorporated herein in its entirety by reference.

TECHNICAL FIELD OF THE INVENTION

The present disclosure relates to a system and method for managing a vehicle by using a mobile terminal, and more particularly, to a system and method for managing a vehicle by sharing information between a mobile terminal and the vehicle.

BACKGROUND OF THE INVENTION

In a conventional vehicle management system using a remote control device, various functions, such as starting of a vehicle, opening/closing of a door, generation of an alarm due to an external impact, are performed, and also a user should carry a separate remote control device for such functions. In addition, since the functions provided by the remote control device are limited, demands of a user requiring various services have not been satisfied.

Recently, as supply of portable terminals has expanded, attempts have been made to perform various methods of managing a vehicle by using portable terminals. However, when a vehicle is managed by using a portable terminal, a plurality of input operations should be performed on the portable terminal, and thus it is difficult to effectively manage the vehicle.

SUMMARY OF THE INVENTION

To address the above-discussed deficiencies of the prior art, it is a primary object to provide a system and method for managing a vehicle by using a mobile terminal, wherein the system and the method may effectively manage operations of the vehicle by using information collected in the mobile terminal.

According to another aspect of the present disclosure, there is provided a system and method for managing a vehicle by using a mobile terminal, wherein the system and the method may effectively manage the vehicle by using vehicle information provided by a vehicle management terminal.

According to another aspect of the present disclosure, there is provided a system and method for managing a vehicle by using a mobile terminal, wherein the system and the method may effectively manage a navigation device of the vehicle based on information collected in the mobile terminal and may be used to guide the vehicle based on information in the mobile terminal in conjunction with the navigation device of the vehicle.

According to an aspect of the present disclosure, there is provided a mobile terminal that includes: a vehicle verification unit configured to receive information for verifying a vehicle management terminal and configured to certify the vehicle management terminal based on the received information. The mobile terminal further includes a terminal information collecting unit configured to collect information regarding control of a vehicle. The mobile terminal further includes a terminal information providing unit configured to provide the collected information to the verified vehicle management terminal, wherein the information provided to the vehicle management terminal is used to control an apparatus included in the vehicle.

In certain embodiments, the mobile terminal includes a vehicle information receiving unit configured to receive information regarding a status of the vehicle from the vehicle management terminal and a display unit configured to display information for managing the vehicle based on the received vehicle information.

Information for verifying the vehicle management terminal can include at least one of an identification value of the vehicle management terminal, an identification value of an access point (AP) positioned in the vehicle, and a specified verification code.

The vehicle verification unit can execute an application for providing information regarding control of the vehicle to the vehicle management terminal upon the certification of the vehicle management terminal.

The information for the management of the vehicle can include at least one of weather, a temperature, a position of a terminal, and a user's schedule.

A destination in a navigation device included in the vehicle can be determined based on the information regarding the user's schedule.

The vehicle information can include information regarding whether the vehicle has arrived at the destination, and the display unit displays information regarding parking areas within a specified range around the destination based on the received vehicle information.

A route in the navigation device included in the vehicle can be determined based on at least one of the weather and the temperature.

A point of interest (POI) to be displayed along the route provided from the navigation device included in the vehicle can be determined based on the information regarding the user's schedule.

The specified operation of the vehicle can be managed by the vehicle management terminal based on at least one of the weather and the temperature.

The vehicle information receiving unit can receive information regarding at least one of mileage of the vehicle and an amount of fuel, and the display unit can display an informing image for managing the vehicle based on the received information.

The informing image can include an informing image indicating that maintenance of the vehicle is necessary or an informing image indicating that refueling is necessary.

According to another aspect of the present invention, there is provided a vehicle management terminal including: a terminal verification unit that receives information for verifying a mobile terminal and certifies the mobile terminal based on the received information; a terminal information receiving unit for receiving information regarding control of the vehicle from the certified mobile terminal; and an apparatus managing unit for driving an apparatus included in the vehicle based on the received information.

The vehicle management terminal can further include a vehicle information providing unit configured to provide information regarding a status of the vehicle to the mobile terminal, wherein the provided vehicle information is used by the mobile terminal to provide an alarm to the user for managing the vehicle.

The vehicle management terminal can further include a vehicle information providing unit for providing the information regarding the status of the vehicle to the mobile terminal, wherein the status information of the vehicle is used by the mobile terminal to make an emergency call for reporting an accident of the vehicle.

Information for managing of the vehicle may include at least one of a weather, a temperature, and a user's schedule.

The apparatus managing unit can determine a route in the navigation device included in the vehicle based on the user's schedule.

The vehicle information providing unit can provide information regarding whether the vehicle has arrived at the destination to the mobile terminal, and the information provided to the mobile terminal can be used in the mobile terminal to provide information regarding parking areas within a predetermined range from the destination.

The apparatus driving unit can determine a route of the navigation device included in the vehicle based on at least one of the weather and the temperature.

The apparatus driving unit can determine a predetermined operation of an apparatus included in the vehicle based on at least one of the weather and the temperature.

The vehicle information providing unit can provide information regarding at least one of mileage of the vehicle and an amount of fuel to the mobile terminal. The information provided to the mobile terminal is used by the mobile terminal to display an informing image for indicating that maintenance of the vehicle is necessary or an informing image for indicating that refueling is necessary.

According to another aspect of the present disclosure, there is provided a method of managing a vehicle by using a mobile terminal, the method including: receiving information for verifying a vehicle management terminal; verifying the vehicle management terminal based on the received information; collecting information regarding control of a vehicle; and providing the collected information to the verified vehicle management terminal, wherein the information provided to the vehicle management terminal is used to control an apparatus included in the vehicle in the vehicle management terminal.

The method can further include receiving information regarding a status of the vehicle from the vehicle management terminal; and displaying information for managing the vehicle based on the received vehicle information.

Information for certifying the vehicle management terminal can include at least one of an identification value of the vehicle management terminal, an identification value of an AP positioned in the vehicle, and a predetermined certification number.

The method can further include executing an application for providing the information regarding the control of the vehicle to the vehicle management terminal upon a verification of the vehicle management terminal.

The information regarding the control of the vehicle can include at least one of weather, a temperature, a position of the mobile terminal, and a user's schedule.

According to another aspect of the present disclosure, there is provided a method of managing a vehicle by using a vehicle management terminal, the method including: receiving information for verifying a mobile terminal; verifying the mobile terminal based on the received information; receiving information regarding control of a vehicle from the verified mobile terminal; and controlling an apparatus included in the vehicle based on the received information.

The method can further include providing information regarding a status of the vehicle to the mobile terminal, wherein the provided vehicle information is used by the mobile terminal to provide an alarm to the user for managing the vehicle.

The information regarding the control of the vehicle can include at least one of a weather, a temperature, and a user's schedule.

The controlling of the apparatus can include controlling a predetermined operation of the apparatus included in the vehicle based on at least one of the weather and the temperature.

According to another aspect of the present disclosure, there is provided a computer readable recording medium having embodied thereon a computer program for performing the method of managing a vehicle by using a mobile terminal.

According to another aspect of the present disclosure, there is provided a computer readable recording medium having embodied thereon a computer program for performing the method of managing a vehicle by using a vehicle management terminal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable device. Hereinafter, the present invention will be described in more detail with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. In the following description, well-known functions or constructions are not described in detail since they would obscure the invention with unnecessary detail. Also, throughout the specification, like reference numerals in the drawings denote like elements.

Throughout the specification, it will also be understood that when an element is referred to as being "connected to" another element, it can be directly connected to the other element, or electrically connected to the other element while intervening elements may also be present. Also, when a part "includes" or "comprises" an element, unless there is a particular description contrary thereto, the part can further include other elements, not excluding the other elements.

Expressions such as "at least one of," when preceding a list of elements, modify the entire list of elements and do not modify the individual elements of the list.

Also, in the present specification, terminal information refers to information collected in a mobile terminal, and also refers to all information used to control operations of apparatuses included in a vehicle. For example, the terminal information includes a user's age, a user's sex, weather, a temperature, a user's schedule, a position of a terminal, and the like.

Figure 1:
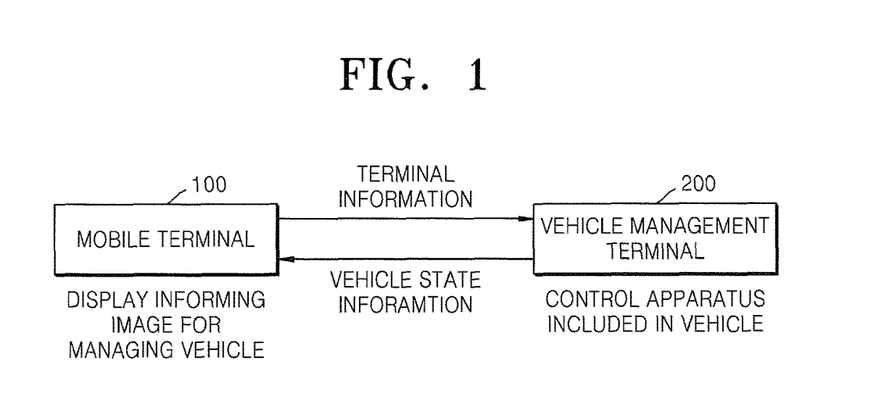
FIG. 1 illustrates a vehicle management system using a mobile terminal according to an embodiment of the present disclosure.

FIG. 1 illustrates a vehicle management system using a mobile terminal 100 according to an embodiment of the present disclosure.

As shown in FIG. 1, the mobile terminal 100 can be connected to a vehicle management terminal 200 to provide terminal information, which is collected to manage a vehicle, to the vehicle management terminal 200.

The vehicle management terminal 200 can control operations of the apparatuses included in the vehicle based on the terminal information received from the mobile terminal 100 and can transmit information regarding a status of the vehicle to the mobile terminal 100.

The mobile terminal 100 can provide an alarm for managing the vehicle to a user by using the received status information of the vehicle.

The mobile terminal 100 includes all kinds of apparatuses that can communicate via a wired/wireless network, such as, a mobile phone, a smart phone, a personal digital assistant (PDA), a notebook computer, and a personal computer (PC).

The vehicle management terminal 200 is a terminal for controlling operations of the apparatuses included in the vehicle and includes, not only apparatuses embedded in the vehicle, but also a terminal separately installed in the vehicle.

The mobile terminal 100 and the vehicle management terminal 200 can be connected to each other via one or more of a wireless fidelity (WIFI) communication, universal serial bus (USB) communication, and a BLUETOOTH communication.

The mobile terminal 100 and the vehicle management terminal 200 can access a separate server (not shown) via a network, and can send/receive various information necessary to manage and control the vehicle to/from the server.

Figure 2:
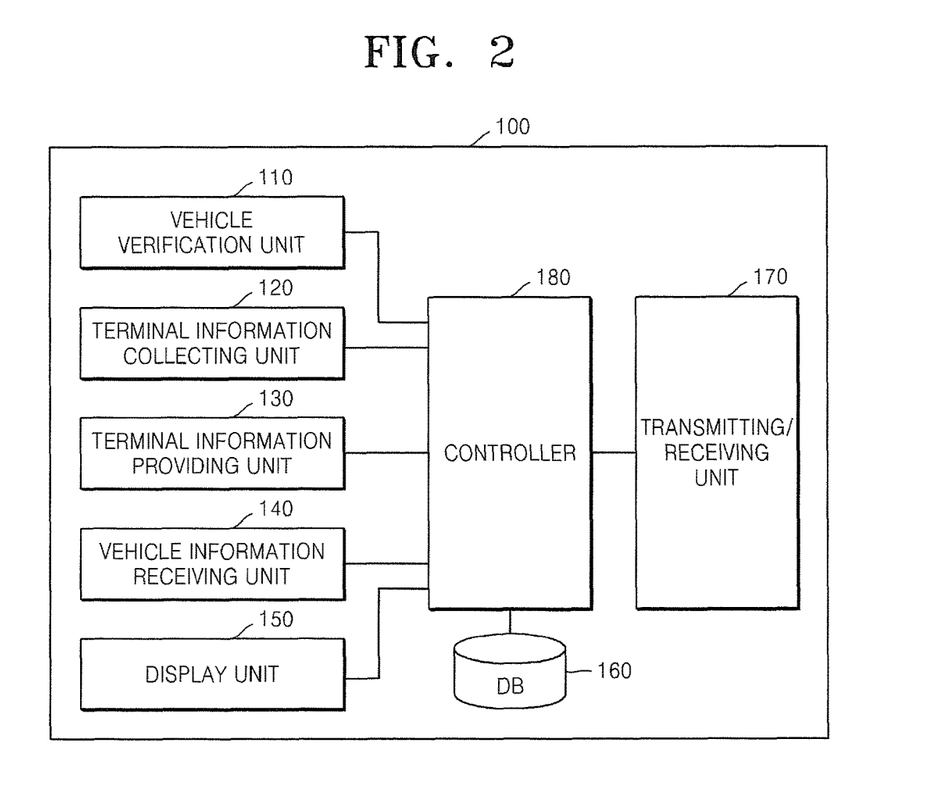
FIG. 2 illustrates the mobile terminal of FIG. 1.

FIG. 2 illustrates the mobile terminal 100 according to embodiments of the present disclosure.

The mobile terminal 100 includes a vehicle verification unit 110, a terminal information collecting unit 120, a terminal information transmission unit 130, a vehicle information receiving unit 140, a display unit 150, a DB 160, a transceiver unit 170, and a controller 180.

The vehicle verification unit 110 receives information for verifying the vehicle management terminal 200 and verifies the vehicle management terminal 200 based on the received information.

The vehicle verification unit 110 can receive an identification value of the vehicle management terminal 200 and a predetermined certification number from the vehicle management terminal 200 and can verify the vehicle management terminal 200. Also, the vehicle verification unit 110 can receive an identification value of an access point (AP) installed in the vehicle and can verify the vehicle management terminal 200 based on the received identification value of the AP.

The vehicle verification unit 110 can also periodically request the vehicle management terminal 200 or the AP for information for verifying the vehicle management terminal 200 and can broadcast the request for the verification information.

The vehicle verification unit 110 can also execute an application for providing terminal information to the vehicle management terminal 200 after verifying the vehicle management terminal 200.

The terminal information collecting unit 120 collects terminal information used to control the apparatuses included in the vehicle. The terminal information collecting unit 120 can collect the terminal information from a separate server (not shown) or can collect the terminal information from information stored in the DB 160 which will be described later. The terminal information can include information regarding, for example, a user's age, a user's sex, a user's schedule, a position of a terminal, weather, a temperature, a traffic situation, a point of interest (POI), and the like, but the present disclosure is not limited thereto. A type of the terminal information for controlling the apparatuses included in the vehicle can be previously set, and the terminal information collecting unit 120 can collect the terminal information of the type that is previously set from the server (not shown) or the DB 160.

The terminal information providing unit 130 provides the collected terminal information to the vehicle management terminal 200. The terminal information provided by the terminal information providing unit 130 can be used in order to control the apparatuses included in the vehicle of the vehicle management terminal 200. The terminal information can be used in order to control operations of, for example, a moisture removing apparatus or a wiper of the vehicle. Also, the terminal information can be used in order to input, for example, a starting point or a destination into a navigation device of the vehicle or in order to determine a route to the destination in the navigation device.

The vehicle information receiving unit 140 receives information regarding a status of the vehicle from the vehicle management terminal 200. The vehicle information receiving unit 140 can receive information regarding, for example, a mileage of the vehicle, a fuel state, and whether maintenance of the vehicle is necessary. The vehicle information receiving unit 140 can also receive information regarding, for example, whether the vehicle arrives at a predetermined destination.

The vehicle information receiving unit 140 can also receive information regarding whether the vehicle has been in an accident or whether a problem has occurred in the vehicle from the vehicle management terminal 200. If the accident or the problem in the vehicle has occurred, the mobile terminal 100 can make an emergency call to report the accident or can make a repair reservation in a separate server (not shown).

The display unit 150 displays an informing image for managing the vehicle based on the received status information of the vehicle. For example, the display unit 150 can receive information regarding mileage of the vehicle and can display an informing image indicating that engine oil needs to be changed. Also, for example, the display unit 150 can receive information regarding a state of fuel of the vehicle and can display a second informing image indicating that refueling is necessary. In this case, the display unit 150 can determine whether to display the informing image indicating that refueling is necessary on a screen based on a distance between a current position of the vehicle and the destination.

The display unit 150 can also, for example, display information regarding parking areas around the destination that has been input into the navigation device. The display unit 150 can also display a walking route between the destination input into the navigation device and a final destination on a screen. For example, when the destination input into the navigation device is a first parking lot and when the user's final destination is a first laboratory, a walking route between the first parking lot and the first laboratory can be displayed on a screen.

The DB 160 can collect terminal information, provide the collected terminal information to the vehicle management terminal 200, receive vehicle information from the vehicle management terminal 200, and store various information necessary to display an informing image based on the received vehicle information.

The transceiver unit 170 can transmit and receive various information including terminal information collected by the mobile terminal 100, the collected terminal information provided to the vehicle management terminal 200, vehicle information received from the vehicle management terminal 200, and the informing image displayed based on the received vehicle information, to/from the vehicle management terminal 200, the AP (not shown), and the server (not shown).

The controller 180 can control the vehicle certification unit 110, the terminal information collecting unit 120, the terminal information providing unit 130, the vehicle information receiving unit 140, the display unit 150, the DB 160, and the transceiver unit 170 so that the mobile terminal 100 can receive terminal information, provide the collected terminal information to the vehicle management terminal 200, receive vehicle information from the vehicle management terminal 200, and display an informing image based on the received vehicle information.

Figure 3:
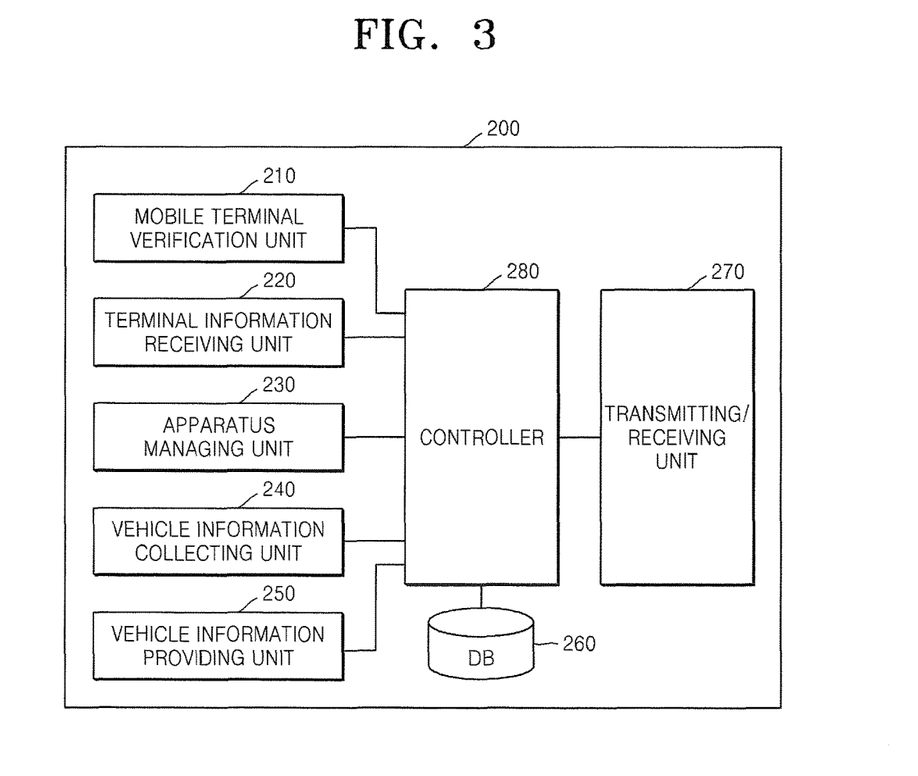
FIG. 3 illustrates a vehicle management terminal of FIG. 1.

FIG. 3 illustrates the vehicle management terminal 200 according to embodiments of the present disclosure.

The vehicle management terminal 200 includes a mobile terminal verification unit 210, a terminal information receiving unit 220, an apparatus managing unit 230, a vehicle information collecting unit 240, a vehicle information providing unit 250, a DB 260, a transceiver unit 270, and a controller 280.

The mobile terminal verification unit 210 can receive information for verifying the mobile terminal 100 and can verify the mobile terminal 100 based on the received information. The mobile terminal verification unit 210 can receive an identification value of the mobile terminal 100 or a predetermined verification number from the vehicle management terminal 200 and can verify the mobile terminal 100. The mobile terminal verification unit 210 can receive the identification value of the mobile terminal 100 connected to the AP from the AP installed in the vehicle.

The mobile terminal verification unit 210 can periodically request the mobile terminal 100 or the AP for information for verifying the mobile terminal 100 and can broadcast the request for the certification information.

Also, the mobile terminal verification unit 210 can request the mobile terminal 100 to execute an application for providing terminal information to the vehicle management terminal 200 after verifying the mobile terminal 100.

The terminal information receiving unit 220 can receive terminal information for controlling the vehicle from the mobile terminal 100. The terminal information includes, for example, a user's age, a user's sex, a user's schedule, a position of a terminal, weather, a temperature, a traffic situation, a POI, and the like, but the present invention is not limited thereto. Also, the terminal information receiving unit 220 can receive information, such as weather, a temperature, a traffic situation, a POI, and the like, from a separate server (not shown).

The apparatus managing unit 230 can control operations of the apparatuses included in the vehicle based on the terminal information. The apparatuses of the vehicle and the operations of the apparatuses can be previously set according to a type of the terminal information. The apparatus managing unit 230 can control the operations of the apparatuses included in the vehicle according to the setting. For example, the apparatus managing unit 230 can control operations of a moisture removing apparatus or a wiper included in the vehicle based on the weather and the temperature. More particularly, when it is raining and a temperature is low, the apparatus managing unit 230 can turn on the moisture removing apparatus or the wiper.

The apparatus managing unit 230 can also control operations of a navigation device based on the terminal information. The apparatus managing unit 230 can input a starting point, a stopover, and a destination into the navigation device by using information regarding a position and a user's schedule included in the terminal information. Also, the apparatus managing unit 230 can determine a route to the destination based on information regarding the weather and the temperature included in the terminal information. For example, when it is snowing and a temperature is low, the apparatus managing unit 230 can determine a route so that a user may arrive at the destination via an expressway having relatively good road conditions. Also, the apparatus managing unit 230 can determine a route to the destination in consideration of information regarding a traffic situation and can select a POI to be displayed along the route based on weather, a temperature, a user's age, a user's sex, a user's schedule, and the like. For example, when the user is a 20-year-old woman, the apparatus managing unit 230 can display POIs that suit a 20-year-old woman's taste along the route.

The vehicle information collecting unit 240 can collect information regarding a status of the vehicle. The vehicle information collecting unit 240 can collect information regarding whether the vehicle has been in an accident or whether a problem has occurred in the vehicle, and can collect information regarding, for example, mileage of the vehicle, a fuel state, and whether maintenance of the vehicle is needed. In certain embodiments, the vehicle information collecting unit 240 can collect various information regarding the status of the vehicle by sensing an impact of the vehicle, the amount of fuel, or a state of engine oil by using various sensors installed in the vehicle. Also, the vehicle information collecting unit 240 can collect, for example, information regarding whether the vehicle has arrived at the destination.

The vehicle information providing unit 250 can provide the collected information regarding the status of the vehicle to the mobile terminal 100. The status information of the vehicle can be used by the mobile terminal 100 to display an informing image for managing the vehicle. Also, the status information of the vehicle can be used by the mobile terminal 100 to provide information regarding parking areas around a destination or to provide a walking route between the destination input into the navigation device and a final destination.

The DB 260 can store various information necessary for the vehicle management terminal 200 to control the vehicle by terminal information received from the mobile terminal 100 and collected information regarding the vehicle, which can be transmitted to the mobile terminal 100.

The transceiver unit 270 can send and receive various information that is necessary for the vehicle management terminal 200 to manage the vehicle using the terminal information received from the mobile terminal 100 and to collect the information regarding the state of the vehicle, and can provide the information to the mobile terminal 100, to/from the mobile terminal 100, the AP (not shown), and the server (not shown).

The controller 280 can control the mobile terminal verification unit 210, the terminal information receiving unit 220, the apparatus managing unit 230, the vehicle information collecting unit 240, the vehicle information providing unit 250, the DB 260, and the transceiver unit 270 so that the vehicle management terminal 200 can control the vehicle by receiving the terminal information from the mobile terminal 100 and to collect the information regarding the state of the vehicle. The controller 280 can provide the information to the mobile terminal 100.

Figure 4:
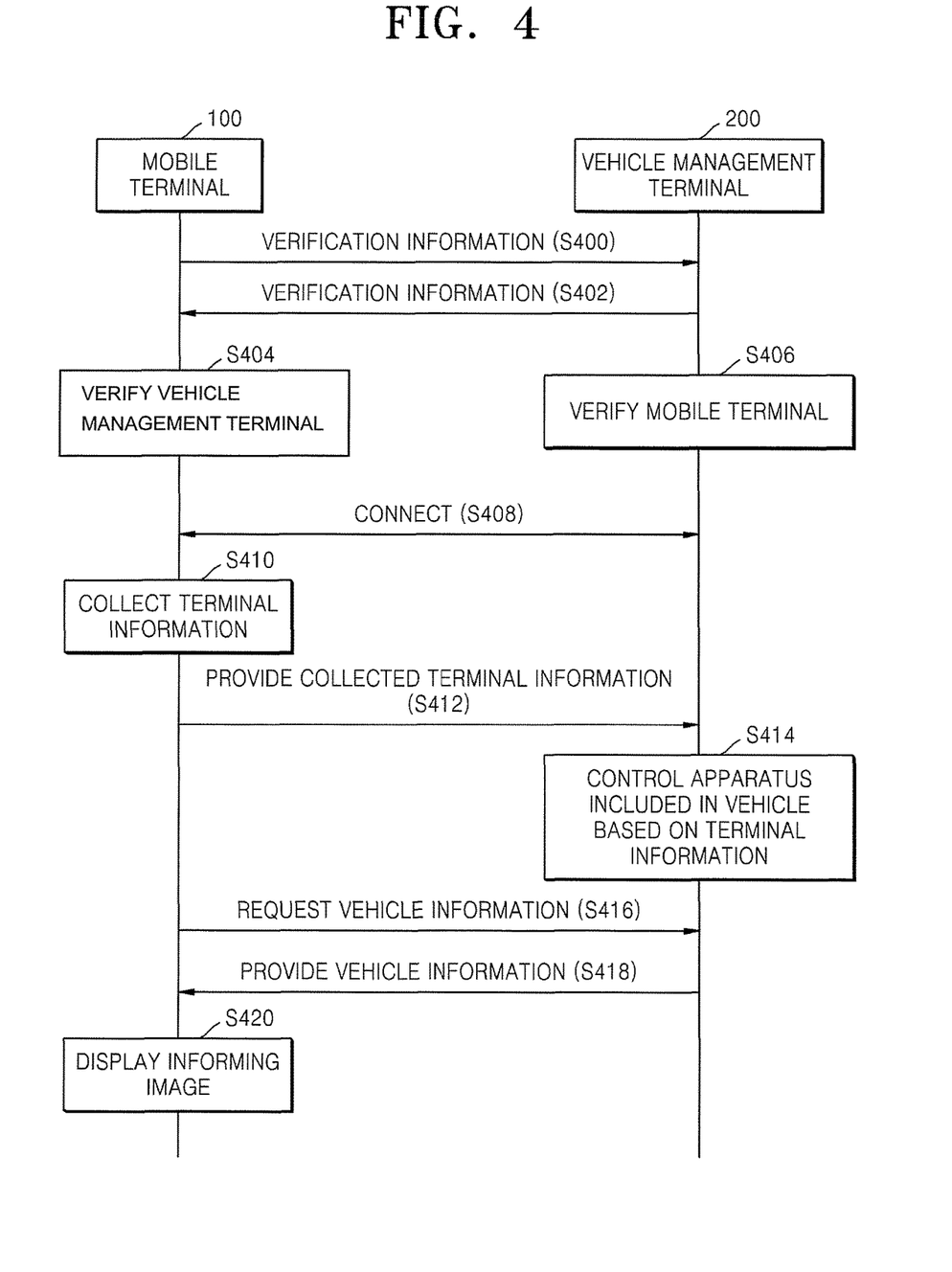
FIG. 4 illustrates a method of managing a vehicle by using the mobile terminal of FIG. 1.

FIG. 4 illustrates a method of managing the vehicle by using the mobile terminal 100 according to embodiments of the present disclosure.

In operation S400, the mobile terminal 100 provides information for verification to the vehicle management terminal 200. In operation S400, the mobile terminal 100 can provide an identification value of the mobile terminal 100 or a predetermined verification code to the vehicle management terminal 200. Meanwhile, the identification value of the mobile terminal 100 connected to the AP can be provided from the AP installed in the vehicle to the vehicle management terminal 200.

In operation S402, the vehicle management terminal 200 provides information for verification to the mobile terminal 100. In operation S402, the vehicle management terminal 200 can provide an identification value of the vehicle management terminal 200 or a predetermined verification code to the mobile terminal 100. Meanwhile, an identification value of the AP can be provided from the AP installed in the vehicle to the mobile terminal 100.

In operation S404, the mobile terminal 100 verifies the vehicle management terminal 200. In operation S404, the mobile terminal 100 can verify the vehicle management terminal 200 based on whether the received verification information corresponds to a predetermined value.

In operation S406, the vehicle management terminal 200 verifies the mobile terminal 100. In operation S406, the vehicle management terminal 200 can verify the vehicle management terminal 200 based on whether the received vehicle management terminal 200 corresponds to a predetermined value. Meanwhile, when both the mobile terminal 100 and the vehicle management terminal 200 are verified, an application for providing the terminal information to the vehicle management terminal 200 can be executed in the mobile terminal 100.

In operation S408, the mobile terminal 100 and the vehicle management terminal 200 are communicatively coupled to each other. In operation S408, when the mobile terminal 100 and the vehicle management terminal 200 have been verified, the mobile terminal 100 and the vehicle management terminal 200 can be communicatively coupled to each other, but the present disclosure is not limited thereto.

In operation S410, the mobile terminal 100 collects terminal information that is used to control apparatuses included in the vehicle. In operation S410, the mobile terminal 100 can collect the terminal information from a separate server (not shown) or collect the terminal information from information stored in the DB 160. The terminal information can include information regarding, for example, a user's age, a user's sex, a user's schedule, a position of a terminal, weather, a temperature, a traffic situation, a POI, and the like, but the present invention is not limited thereto. A type of the terminal information for controlling the apparatuses included in the vehicle can be previously set, and the mobile terminal 100 can collect the terminal information of the type that is previously set from the server (not shown) or the DB 160.

In operation S412, the mobile terminal 100 provides the collected terminal information to the vehicle management terminal 200.

In operation S414, the vehicle management terminal 200 controls the apparatuses included in the vehicle based on the terminal information. The list of apparatuses included in the vehicle and operations of the apparatuses that will be controlled can be previously set according to the type of the terminal information, and the vehicle management terminal 200 can control the operations of the apparatuses included in the vehicle according to the setting. For example, the vehicle management terminal 200 can control operations of a moisture removing apparatus or a wiper included in the vehicle based on the weather and the temperature. More particularly, when it is raining and a temperature is low, the apparatus managing unit 230 can turn on the moisture removing apparatus or the wiper.

Also, the vehicle management terminal 200 can control operations of the navigation device based on the terminal information. The vehicle management terminal 200 can transmit a starting point, a stopover, and a destination into the navigation device based on information regarding a current position and a user's schedule included in the terminal information. Also, the vehicle management terminal 200 can determine a route to the destination based on information regarding the weather and the temperature included in the terminal information. For example, when it is snowing and a temperature is low, the vehicle management terminal 200 can determine a route so that a user can arrive at the destination via an expressway having good road conditions. Also, the vehicle management terminal 200 can determine a route to the destination in consideration of information regarding a traffic situation and can select a POI to be displayed for along the route based on weather, a temperature, a user's age, a user's sex, a user's schedule, and the like. For example, when the user is a 20-year-old woman, the vehicle management terminal 200 can allow a POI that is suitable for a 20-year-old woman's taste to be displayed for along the route. Also, for example, when a plurality of places are included in the user's schedule, the vehicle management terminal 200 can allow POIs corresponding to the type of the place included in the user's schedule to be displayed for along the route.

In operation S416, the mobile terminal 100 requests the vehicle management terminal 200 for information regarding a state of the vehicle. In operation s418, when an operation of the vehicle ends, the mobile terminal 100 can receive the information regarding the end of the operation of the vehicle from the vehicle management terminal 200 and can request the vehicle management terminal 200 for information regarding the status of the vehicle. For example, when gears of the vehicle are positioned in 'PARK' or when a hand brake of the vehicle is turned on, the mobile terminal 100 can check this by using the vehicle management terminal 200 and can request the vehicle management terminal 200 to provide information regarding the state of the vehicle.

Also, in operation S416, the mobile terminal 100 can determine whether a user arrives at a destination based on position information collected in the mobile terminal 100, and when it is determined that the user has arrived at the destination, the mobile terminal 100 can request the vehicle management terminal 200 for information regarding the state of the vehicle. The mobile terminal 100 can also receive the information regarding whether the user has arrived at the destination from the navigation device of the vehicle, and when it is determined that the user has arrived at the destination, the mobile terminal 100 can request the vehicle management terminal 200 for the status information of the vehicle.

In operation S418, the vehicle management terminal 200 provides information regarding the status of the vehicle to the mobile terminal 100. The status information of the vehicle can include information regarding whether an accident of the vehicle has occurred and whether a problem has occurred in the vehicle. For example, the information regarding the state of the vehicle can include information regarding mileage of the vehicle, a fuel status, whether maintenance of the vehicle is necessary, and whether the vehicle has arrived at a predetermined destination. Also, the information regarding the state of the vehicle can be collected by the vehicle management terminal 200 by sensing an impact of the vehicle, the amount of fuel, or a state of engine oil by using various sensors installed in the vehicle.

In operation S420, the mobile terminal 100 displays an informing image for managing the vehicle based on the information regarding the state of the vehicle. In operation S420, the mobile terminal 100 can receive information regarding, for example, the mileage of the vehicle and can display an informing image indicating that the engine oil needs to be changed. Also, the mobile terminal 100 can receive information regarding the status of fuel of the vehicle and can display an informing image indicating that refueling is necessary. In this embodiment, the mobile terminal 100 can determine whether to display the informing image indicating that refueling is necessary on a screen based on a distance between the current position of the vehicle and the destination.

The mobile terminal 100 can also, for example, display information about parking around a destination that is input into the navigation device. The mobile terminal 100 can also display a walking route between the destination input into the navigation device and a final destination on a screen. For example, when the destination input into the navigation device is a first parking lot and when the user's final destination is a first laboratory, a walking route between the first parking lot and the first laboratory can be displayed on a screen.

Also, the mobile terminal 100 can receive information regarding whether an accident of the vehicle has occurred and whether a problem has occurred in the vehicle, and when the accident of the vehicle has occurred, the mobile terminal 100 can make an emergency call or can make a repair reservation through a separate server (not shown).

Figure 5:
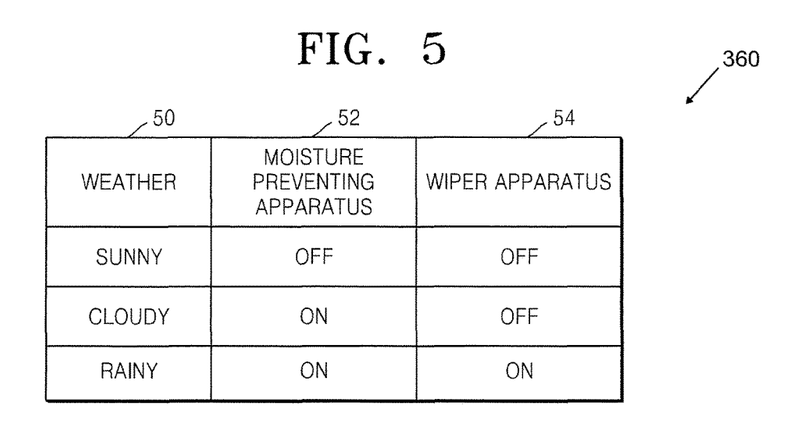
FIG. 5 illustrates a vehicle control table stored in a database (DB) of the vehicle management terminal of FIG. 1.

FIG. 5 illustrates a vehicle control table stored in a DB 360 according to embodiments of the present disclosure.

The vehicle control table can include a weather field 50, a moisture preventing apparatus field 52, and a wiper apparatus field 54. Weather information collected in the mobile terminal 100 is recorded in the weather field 50, and a control operation of a moisture preventing apparatus corresponding to weather is recorded in the moisture preventing apparatus field 52. Also, a control operation of a wiper apparatus corresponding to weather is recorded in the wiper apparatus field 54.

For example, when it is cloudy, a control operation in the vehicle control table can be recorded so that the moisture preventing apparatus can operate and the wiper apparatus does not operate. When it is sunny, a control operation in the vehicle control table can be recorded so that neither the moisture preventing apparatus nor the wiper apparatus can operate.

Figure 6:
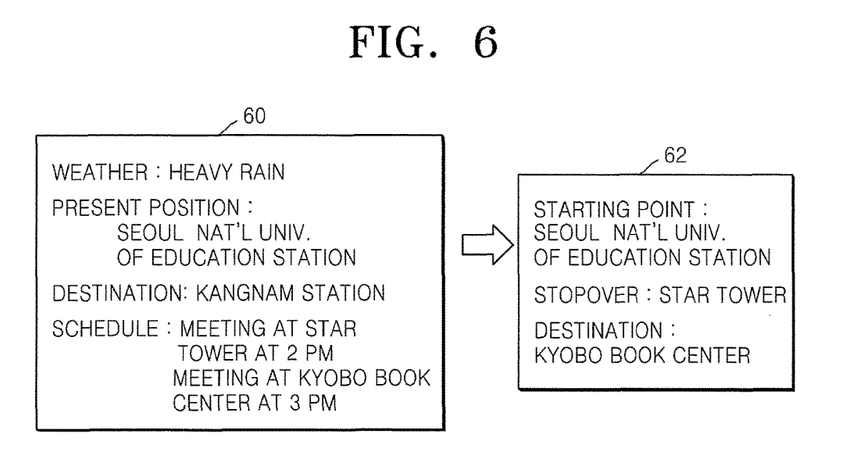
FIG. 6 illustrates an example where a navigation device is controlled based on terminal information according to an embodiment of the present disclosure.

FIG. 6 illustrates an example where a navigation device is controlled based on terminal information 60 according to embodiments of the present disclosure.

The terminal information 60 can include information regarding weather, a present position of a vehicle, a destination, and a user's schedule, and input information 62 of the navigation device included in the vehicle can be determined based on the terminal information 60.

For example, when a present position of the vehicle is 'Seoul Nat'l Univ. of Education Station' and when the user's schedule includes an appointment for 'meeting at Star Tower at 2 pm' and 'meeting at Kyobo Book Center at 3 pm', the vehicle management terminal 200 can input a starting point, a stopover, and a destination of the navigation device as 'Seoul Nat'l Univ. of Education Station', 'Star Tower', and 'Kyobo Book Center', respectively, based on the user's schedule and present position.

Also, for example, the terminal information 60 can include a destination value that has been input into the mobile terminal 100 by a user. In this case, the vehicle management terminal 200 can set the input destination value as a destination of the navigation device.

In addition, when present weather is 'heavy rain', the vehicle management terminal 200 can control the navigation device so as to generate a route along a road having a relatively good drainage state.

Figure 7:
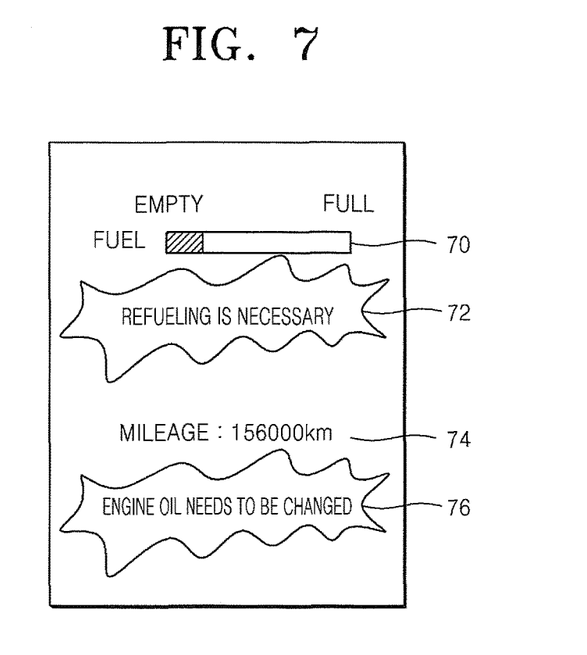
FIG. 7 illustrates an example where an informing image for managing a vehicle is displayed in a mobile terminal based on vehicle information according to an embodiment of the present disclosure.

FIG. 7 illustrates an example where an informing image for managing a vehicle is displayed in the mobile terminal 100 based on vehicle information according to embodiments of the present disclosure.

A bar 70 indicating an amount of fuel in the vehicle and a phrase 72 indicating that refueling is necessary can be displayed as informing images in the mobile terminal 100, and a phrase 74 for informing about mileage of the vehicle and the phrase 76 indicating that the engine oil needs to be changed can be displayed as informing images in the mobile terminal 100.

Figure 8:
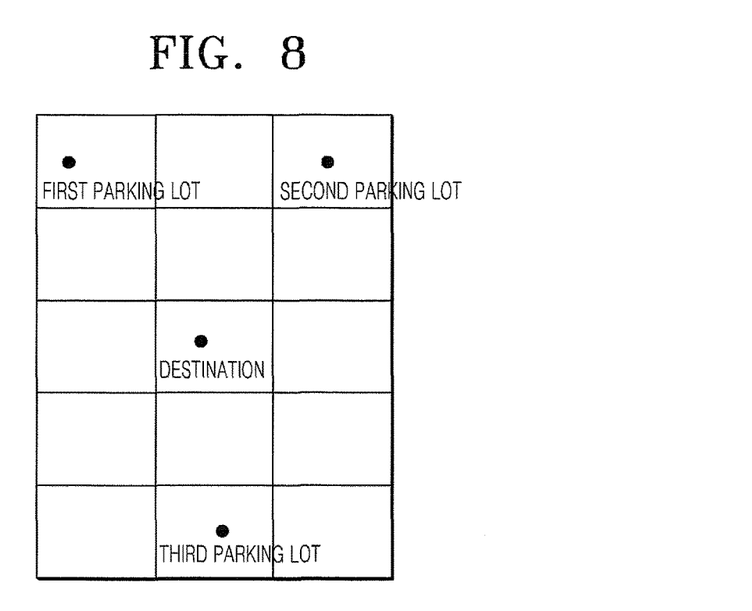
FIG. 8 illustrates an example where information regarding parking around a destination is displayed in a mobile terminal according to an embodiment of the present disclosure.

FIG. 8 illustrates an example where information regarding parking around a destination is displayed in the mobile terminal 100 according to embodiments of the present disclosure.

The mobile terminal 100 can determine whether a user has arrived at the destination based on current position information collected in the mobile terminal 100, and when it is determined that the user has arrived at the destination, the mobile terminal 100 can display position information regarding a parking lot near the destination based on the current position of the mobile terminal 100.

The mobile terminal 100 can receive the information about whether the user has arrived at the destination from a navigation device of the vehicle, and when it is determined that the user has arrived at the destination, the mobile terminal 100 can display position information regarding the parking lot near the destination.

Figure 9:
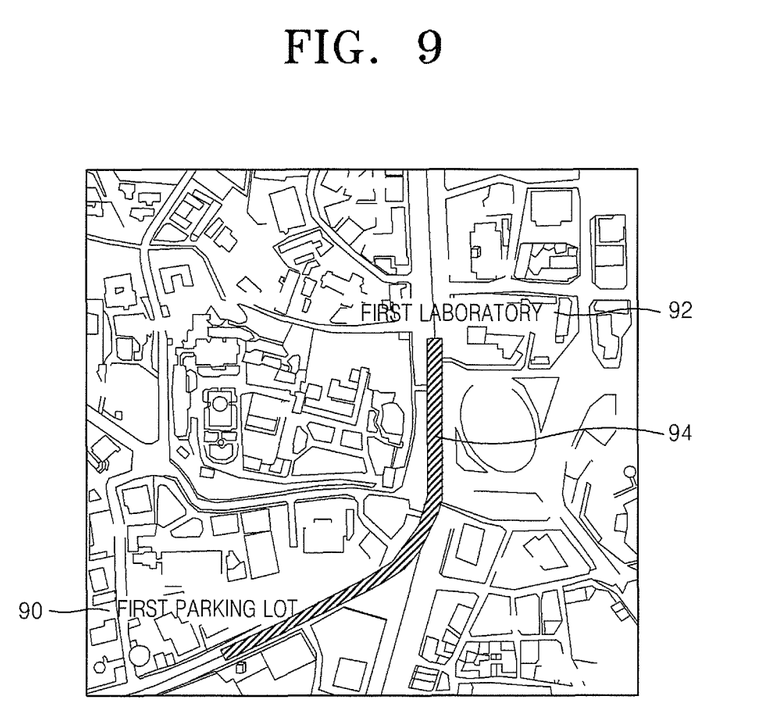
FIG. 9 illustrates an example where information regarding a walking route to a final destination is displayed in a mobile terminal according to an embodiment of the present disclosure.

FIG. 9 illustrates an example where information regarding a walking route to a final destination is displayed in the mobile terminal 100 according to embodiments of the present disclosure.

The mobile terminal 100 can display the walking route between a destination input into a navigation device and the final destination on a screen. For example, when the destination input into the navigation device is a first parking lot 90 and when a user's final destination is a first laboratory 92, a walking route 94 between the first parking lot 90 and the first laboratory 92 can be displayed on the screen. In this case, the final destination can be previously stored by a user in the mobile terminal 100.

According to embodiments of the present disclosure, operations of a vehicle can be effectively controlled by using information collected in a mobile terminal.

Also, according to embodiments of the present disclosure, a system and method for managing a vehicle by using a mobile terminal can be provided, wherein the system and the method can effectively manage the vehicle by using vehicle information provided by a vehicle management terminal.

In addition, according to embodiments of the present disclosure, a system and method for managing a vehicle by using a mobile terminal can be provided, wherein the system and the method can effectively control operations of a navigation device of the vehicle based on information collected in the mobile terminal and can be used to guide the vehicle based on a route in the mobile terminal in conjunction with the navigation device of the vehicle.

The one or more embodiments of the present disclosure can be written as computer programs in a recording medium, e.g., a program module to be executed in computers, which include computer-readable commands. The computer storage medium can include any usable medium that can be accessed by computers, volatile and non-volatile media, and detachable and non-detachable media. Also, the computer storage medium can include a computer storage medium and a communication medium. The computer storage medium includes all of volatile and non-volatile media, and detachable and non-detachable media which are designed to store information including computer readable commands, data structures, program modules or other data.

The communication medium includes computer-readable commands, a data structure, a program module, and other transmission mechanisms, and includes other information transmission media.

The present disclosure can, however, be embodied in many different forms and should not be construed as being limited to the embodiments set forth herein; rather, these embodiments are provided so that this disclosure will be thorough and complete, and will fully convey the inventive concept to those of ordinary skill in the art. For example, configuration elements that are in singular form can be executed in a distributed fashion, and also, configuration elements that are distributed can be combined and then executed.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile terminal comprising:
a transceiver configured to receive verification information to verify a vehicle management terminal;
a controller configured to:
verify the vehicle management terminal based on the received verification information;
receive, via the transceiver, a request for executing an application regarding the vehicle management terminal, from the vehicle management terminal;
execute the application regarding the vehicle management terminal in response to the request; and
collect state information regarding a plurality of states of a vehicle,
wherein the application is capable of providing additional information to the vehicle management terminal, the additional information comprising user profile information and weather information,
wherein the controller is configured to control the transceiver to provide the user profile information to the verified vehicle management terminal, by using the executed application,
wherein the weather information provided to the vehicle management terminal is used to control a navigation device of the vehicle,
wherein a particular route from a current location of the vehicle to a particular destination is determined and displayed by the navigation device,
wherein a point of interest (POI), that is determined based on at least one place included in schedule information which is included in the additional information and is prestored in a memory of the mobile terminal, is displayed along the displayed particular route between the current location of the vehicle and the particular destination, and wherein the transceiver is configured to receive information that indicates the vehicle has arrived at the particular destination, wherein the controller controls a display of the mobile terminal to display a walking route from the particular destination to a final destination, and wherein the controller provides information for managing the vehicle, based on both the states of the vehicle and states of a navigation service provided by the navigation device.

2. The mobile terminal of claim 1, wherein the verification information to verify the vehicle management terminal comprises at least one of an identification value of the vehicle management terminal, an identification value of an access point (AP) positioned in the vehicle, or a predetermined verification code.

3. The mobile terminal of claim 1, wherein the controller is configured to execute the application configured to provide the additional information to the vehicle management terminal to manage the vehicle when the vehicle management terminal is verified.

4. The mobile terminal of claim 1, wherein the display is configured to display the collected state information to manage the vehicle.

5. The mobile terminal of claim 4, wherein the state information comprises at least one of a mileage of the vehicle or an amount of fuel, and wherein the display displays an informing image to manage the vehicle based on the state information.

6. The mobile terminal of claim 5, wherein the informing image comprises a first informing image indicating that maintenance of the vehicle is necessary or a second informing image indicating that refueling is necessary.

7. The mobile terminal of claim 4, wherein the state information comprises information regarding whether an accident of the vehicle has occurred.

8. The mobile terminal of claim 4, wherein the state information comprises information regarding whether an accident of the vehicle has occurred.

9. The mobile terminal of claim 4, wherein the state information comprises information regarding whether maintenance of the vehicle is necessary.

10. The mobile terminal of claim 4, wherein the additional information to manage the vehicle comprises at least one of a temperature, or a position of the mobile terminal.

11. The mobile terminal of claim 10, wherein the particular route, that is displayed by the navigation device, is determined based on at least one of the weather or the temperature.

12. The mobile terminal of claim 10, wherein a predetermined operation of the vehicle is controlled by the vehicle management terminal based on at least one of the weather or the temperature.

13. The mobile terminal of claim 10, wherein the particular destination is determined using the navigation device of the vehicle based on the schedule information regarding the schedule.

14. The mobile terminal of claim 13, wherein when the received information indicates whether the vehicle has arrived at the particular destination, the display is configured to display proximity information about parking areas in a predetermined area around the destination based on the received information.

15. A method of using a mobile terminal to manage a vehicle, the method comprising:
    receiving verification information to verify a vehicle management terminal;
    verifying the vehicle management terminal based on the received verification information;
    receiving a request for executing an application regarding the vehicle management terminal, from the vehicle management terminal;
    executing the application regarding the vehicle management terminal in response to the request;
    collecting state information regarding a plurality of states of the vehicle to manage the vehicle, wherein the application is capable of providing additional information to the vehicle management terminal, the additional information comprising user profile information and weather information; and
    providing the user profile information to the verified vehicle management terminal using the executed application,
    wherein the weather information provided to the vehicle management terminal is used to generate a control command to control a navigation device of the vehicle, wherein a particular route from a current location of the vehicle to a particular destination is determined and displayed by the navigation device, wherein a point of interest (POI), that is determined based on at least one place included in schedule information which is included in the additional information and is prestored in a memory of the mobile terminal, is displayed along the displayed particular route between the current location of the vehicle and the particular destination, and wherein the mobile terminal is configured to receive information that indicates the vehicle has arrived at the particular destination and display a walking route from the particular destination to a final destination, and
    provide information for managing the vehicle, based on both the states of the vehicle and states of a navigation service provided by the navigation device.

16. The method of claim 15, wherein the verification information to verify the vehicle management terminal comprises at least one of an identification value of the vehicle management terminal, an identification value of an Access Point (AP) positioned in the vehicle, or a predetermined verification code.

17. The method of claim 15, further comprising executing the application to provide the additional information to the vehicle management terminal to manage the vehicle when the vehicle management terminal is verified.

18. The method of claim 15, further comprising:
    receiving status information regarding a status of the vehicle from the vehicle management terminal; and
    displaying the received status information to manage the vehicle.

19. The mobile terminal of claim 18, wherein the additional information to manage the vehicle comprises at least one of a temperature, or a position of the mobile terminal.

20. A non-transitory, computer-readable medium comprising one or more executable instructions that, when executed by a processor, cause the processor to:
    receive verification information to verify a vehicle management terminal;
    verify the vehicle management terminal based on the received verification information;
    receive a request for executing an application regarding the vehicle management terminal, from the vehicle management terminal;

execute the application regarding the vehicle management terminal in response to the request;

collect state information regarding a plurality of states of the vehicle to manage the vehicle, wherein the application is capable of providing additional information to the vehicle management terminal, the additional information comprising user profile information and weather information; and provide the user profile information to the verified vehicle management terminal using the executed application, wherein the weather information provided to the vehicle management terminal is used to generate a control command to control a navigation device of the vehicle, wherein a particular route from a current location of the vehicle to a particular destination is determined and displayed by the navigation device, wherein a point of interest (POI), that is determined based on at least one place included in schedule information which is include in the additional information and is prestored in a memory of a mobile terminal, is displayed along the displayed particular route between the current location of the vehicle and the particular destination, and wherein the mobile terminal is configured to:

receive information that indicates the vehicle has arrived at the particular destination;

display at least one position information associated with a parking lot near the particular destination;

display a walking route from the parking lot to a final destination; and provide information for managing the vehicle, based on both the states of the vehicle and states of a navigation service provided by the navigation device.

* * * * *